J. D. ROOTS.
VALVE OPERATING GEAR OF INTERNAL COMBUSTION ENGINES.
APPLICATION FILED AUG. 10, 1911.
1,127,924.
Patented Feb. 9, 1915.
3 SHEETS—SHEET 1.
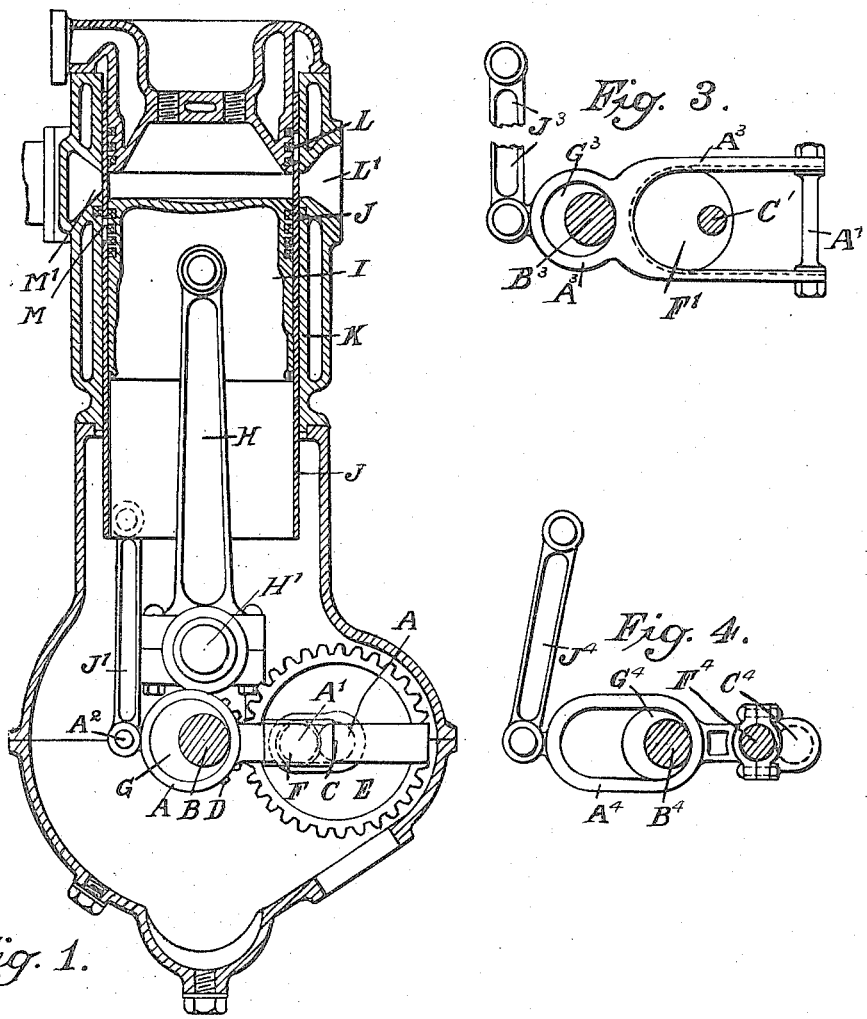
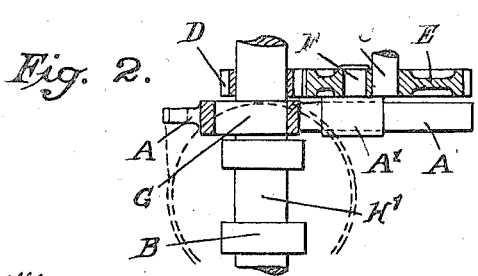
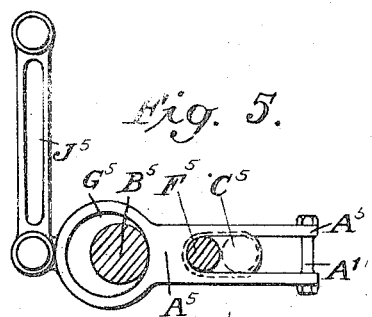
Inventor:
James Dennis Roots,

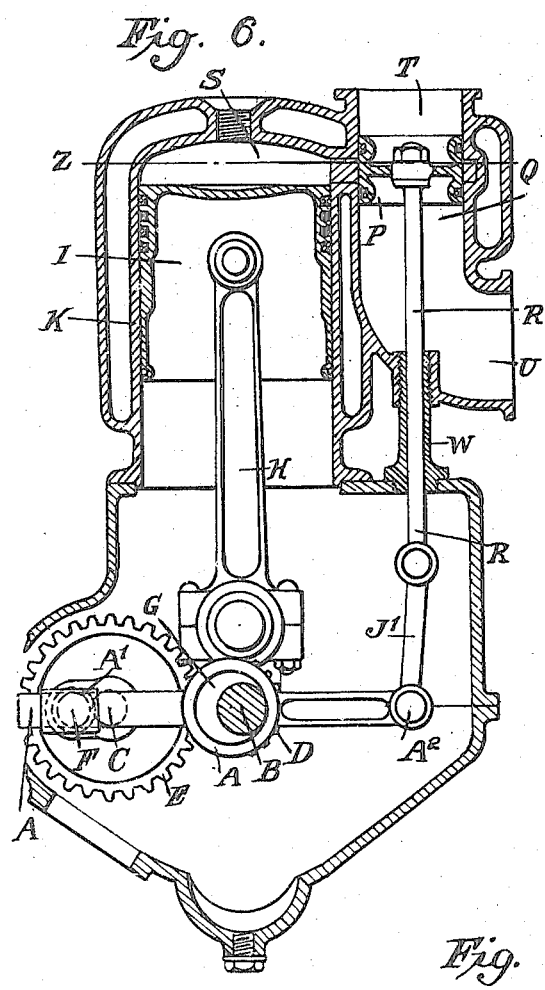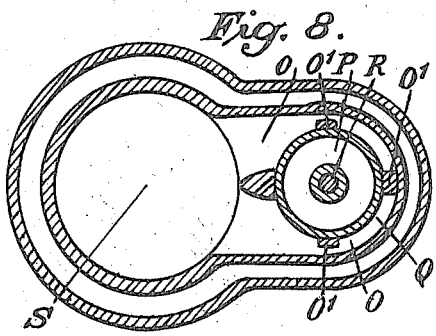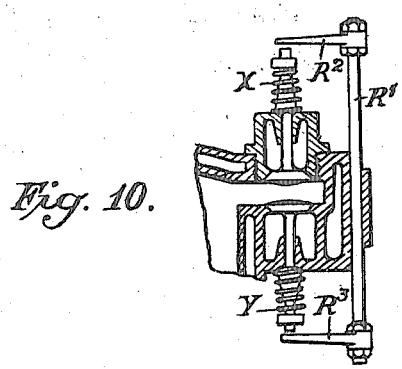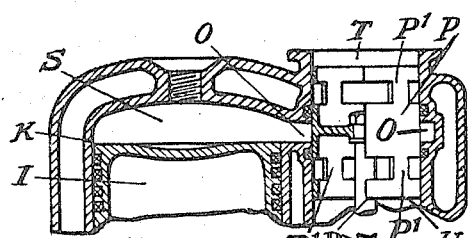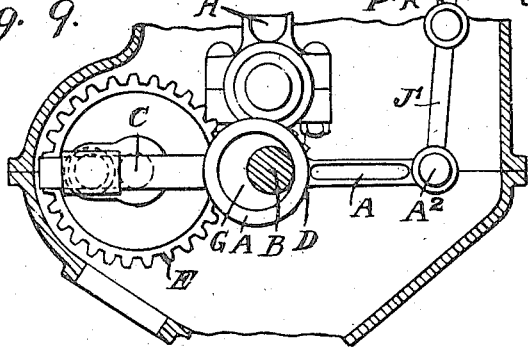

UNITED STATES PATENT OFFICE.

JAMES DENNIS ROOTS, OF LONDON, ENGLAND.

VALVE-OPERATING GEAR OF INTERNAL-COMBUSTION ENGINES.

1,127,924. Specification of Letters Patent. Patented Feb. 9, 1915.

Application filed August 10, 1911. Serial No. 643,443.

*To all whom it may concern:*

Be it known that I, JAMES DENNIS ROOTS, a subject of the King of Great Britain, and a resident of 58 Avonmore road, West Kensington, London, W., England, have invented new and useful Improvements in Valve-Operating Gears of Internal-Combustion Engines, of which the following is the specification.

This invention relates to improvements in valve operating gear of four stroke cycle internal combustion engines and particularly to valve operating mechanism for actuating the piston, the sleeve, or other valve for such internal combustion engines.

An object of the present invention is to provide a single oscillating lever utilizing the movement of the oscillating lever adapted to control valves of internal combustion engines in which the lever actuates the valve by reason of its association with the crank shaft and the half speed shaft, several modifications being illustrated, in each of which the oscillating lever or arm has three points of connection with parts of the mechanism, that is to say it is connected to the sleeve or valve rod, to the crank or fulcrum shaft, and to the half speed shaft, whereby the valve is reciprocated at the desired times and held stationary or practically so during the compression and explosion strokes.

The half speed shaft may be driven in any suitable manner such as by gear wheels or chain and chain wheels.

In order that my invention may be completely understood, reference should be made to the accompanying sheets of drawings, some of the figures of which are diagrammatic.

Figure 10:
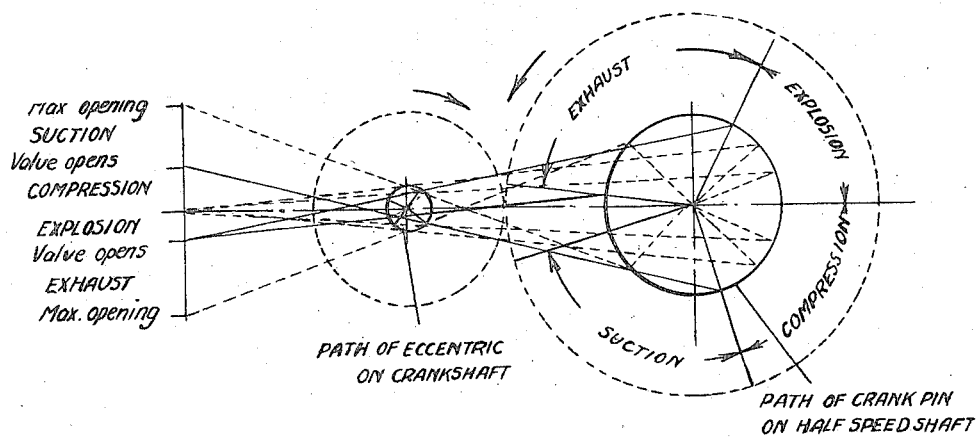
Figure 11:
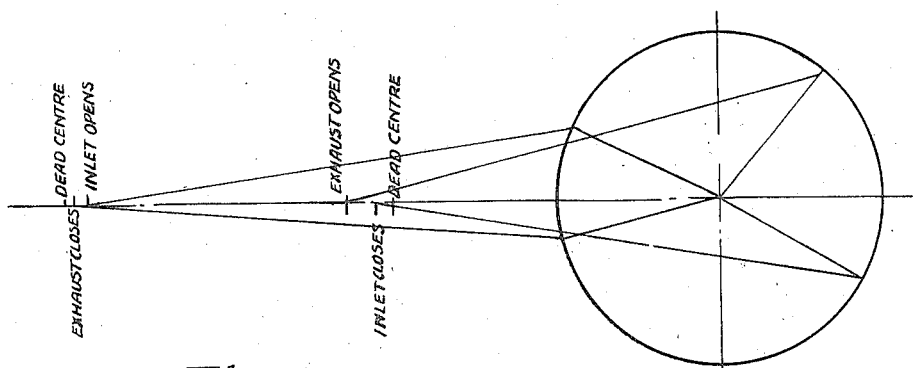

Figure 1 is a sectional elevation of the invention shown operating a sleeve valve of the end cylinder of a twin or multi-cylinder engine, or of a single cylinder engine. Fig. 2 is a sectional plan of the operating gear as in Fig. 1. Fig. 3 is a diagram elevation of the gear when the lever is slotted or bifurcated, embracing an eccentric on the half speed shaft. Fig. 4 is a diagram elevation showing the slot of the lever embracing the eccentric on the crank shaft. Fig. 5 shows the lever with a slot embracing a crank pin on the half speed shaft. Fig. 6 is a sectional elevation showing the application of the gear to a piston valve. Fig. 7 is a sectional plan of this gear. Fig. 8 is a sectional plan on the line Z of Fig. 6. Fig. 9 is a part sectional elevation of the gear shown applied to another piston valve. Fig. 10 is a diagram showing the positions of the lever and gear and the valve movements relatively to the strokes of the cycle. Fig. 11 is a diagram showing the valve timing obtainable by this gear relatively to the stroke of working piston and position of main crank of engine.

A is the oscillating lever or arm.

B is the main crank shaft and C is the half speed shaft.

D is the small gear wheel on the main crank shaft and E is the larger gear wheel on the half speed shaft.

F is the crank pin on the half speed shaft.

G is the eccentric on the main crank shaft preferably turned up solid with the shaft, its strap forms part of the lever A. A crank might be employed in lieu of the eccentric G, but it would not be so convenient.

H is the connecting-rod and $H^1$ the crank pin on the crank-shaft B.

Referring to Fig. 1, the working piston I reciprocates within the sleeve valve J of known construction and the sleeve valve J is adapted to reciprocate within the cylinder K. The ports L and M in the said sleeve are by the operation of the oscillating lever A brought to register with the ports $L^1$ and $M^1$ in the cylinder respectively at the ends of the strokes of the oscillating lever A. During the compression and explosion strokes, both ports in the cylinder $L^1$ $M^1$, inlet and outlet respectively are closed, the lever holding the sleeve practically stationary in the mid-position during these strokes. It will be observed from the valve action obtainable by this gear, Figs. 11 and 12, that the movement and timing of opening and closing is almost ideal in a four stroke cycle internal combustion engine. There is a rapid opening of both the inlet and exhaust ports by the one sleeve or valve and the valve or sleeve is held in a mid-position practically stationary during the intermediate strokes, compression and explosion. The sleeve $A^1$ may conveniently be formed integrally with the crank pin F, and is adapted to slide to and fro on the arm of the lever A.

Referring to Fig. 3 I have illustrated a modification which is a substitute for the half speed driving mechanism as shown in Fig. 1 and in Fig. 2. The shaft C' has an eccentric F' which eccentric works within a slotted or bifurcated portion of the lever A³ and a number of such eccentrics may be fitted to the half speed shaft, to operate the sleeve or piston valve of each working cylinder of an engine. The slot is of such length as to just permit of the rotation of the eccentric F' within it, the movement of the lever being a combination of the actuation produced by both eccentrics. In this view, which is a modification, the crank shaft B³ has an eccentric G³ on which the lever A³ is mounted and the lever A³ has a link J³ by which it may be connected to the valve.

In the modification shown in Fig. 4, the lever A⁴ has a slot intermediate its length and is of such area as to permit the rotation of the eccentric G⁴ therein, the said eccentric G⁴ being mounted on the crank shaft B⁴. In this modification, the link J⁴ may be connected to a valve and the half time shaft F⁴ has a crank C⁴ which is a construction similar to that shown in Fig. 1.

In Fig. 5, the lever A⁵ is mounted on an eccentric G⁵ carried by the crank B⁵ and the link J⁵ which is pivoted to the lever A⁵ is adapted for connection to a valve. The lever A⁵ is provided with a slot to receive the crank pin F⁵ which is carried by the half time crank C⁵. The forked ends of the lever A⁵ are connected together by a bolt A". In each of the arrangements just described, the eccentric is preferably turned or formed as a part of the crank shaft B and the link is, in each example, pivotally connected to the lever at one end and has its opposite end for attachment to a valve.

Figs. 6, 7, 8 and 9 illustrate the gear and a piston valve of known type. The gear in Figs. 6, 7, and 9 is of similar construction and operation to that shown in Figs. 1 and 2 and in this form the lever A⁶ has a sliding sleeve A'" provided with a wrist pin F⁶ to which the gear wheel E⁶ is connected, the said gear wheel being rotatable on the shaft C⁶ and meshes with the gear wheel D⁶. The crank B⁶ has an eccentric G⁶ on which the lever A⁶ is mounted and one end of the lever is provided with a lever J⁶ for connection to a valve, it being observed that the lever is in such relation to the valve mechanism as to effect a direct operation of the said valve mechanism as illustrated in Fig. 6. The valve P is secured on a shoulder at the end of the rod R. The slide valve P is reciprocated in the valve cylinder Q which may be jacketed as shown. The valve P is shown in the mid-position closing both outlets during the compression and explosion strokes. Toward the end of the working stroke, the slide valve P is rapidly moved downwardly until the port or passage O surrounding the piston or slide P is fully open, leaving free communication between the combustion chamber S and the exhaust outlet T. Near the end of the exhaust stroke the piston is moved rapidly upward closing the port O and immediately opens to the inlet U, and allows during the suction stroke free communication between the combustion chamber S and the inlet U. The piston slide P, Figs. 6 and 8, has ordinary piston rings and to allow these to slide over the port O, the bridge pieces O¹ are cast or otherwise suitably formed in the cylinder Q. In Fig. 9, the valve operation or movement is precisely the same, but stationary packing rings are provided as shown fitted in grooves in the cylinder wall Q above and below the port, and bridge pieces P¹ are formed in the valve to allow the valve to slide over the rings, the rings being of less diameter than the piston valve and adapted to press inwardly. The piston valve P, Fig. 9 is shown half in section and half in elevation. In the example shown of piston valve, the guide bush or sleeve W is screwed or suitably secured in the valve cylinder wall Q, and then screwed into the wall of the crank chamber as shown, a convenient arrangement for preventing the leakage of lubricating oil and excluding dust and the like.

The diagrams Figs. 10 and 11, show the almost ideal action of this valve operating gear for this cycle. It will be observed that the gear holds the valve, of the slide, sleeve, or piston type, practically stationary in the midposition during the compression and explosion strokes. The two dotted circles Fig. 10 represent the gear wheel pitch lines, and the inner circles the throw of the respective eccentrics or cranks. The dotted and full straight lines represent the different positions of the oscillating lever. In Fig. 11, the diagram also shows the times of opening and closing the valve, but in another way. The angle (of the crank pin of the main shaft) shown in this diagram at which the exhaust valve begins to open is one very usual for high speed engines with mushroom valves, but when employing a slide or piston the outlet may be rendered so much more free having a larger outlet passage and more rapid opening, that the engine may be either run at a higher speed without back pressure, or the valve opening may be set later, in either case giving greater power. The half speed shaft may be driven by chain or by skew gear if desired.

In this invention it will be observed that the piston valve or sleeve is always operated directly from the crank shaft, the half speed shaft serving to modify the action.

To any one acquainted with the art, the advantages of operating directly from the crank shaft will be obvious, one of them being that there are larger and heavier bearings to take the stresses and a heavier shaft, the larger rotating eccentric is also better balanced by the crank pin and slabs.

It has not before been possible in valve gears provided in other inventions to operate the piston or slide valves directly from the crank shaft. The half speed shaft becomes by this invention of much less importance and may be of less diameter and weight, as it is no longer a valve operating shaft, but a shaft serving to modify the movement of the actuating eccentric on the main shaft.

What I do claim as my invention and desire to secure by Letters Patent is:—

1. In four stroke cycle internal combustion engines, a combustion cylinder provided with a port or ports adapted to be placed in communication alternately with inlet and exhaust means, a reciprocating member adapted to open and close said port or ports to said inlet and exhaust means, an eccentric secured to the crank shaft, a lever fulcrumed on said eccentric intermediate its ends, connecting means connected to said reciprocating member and to said lever contiguous one end, and half-time means positioned at the other end of said lever for oscillating said lever.

2. In four stroke cycle internal combustion engines, a combustion cylinder provided with a port or ports adapted to be placed in communication alternately with inlet and exhaust means, a reciprocating controlling member to open and close said port or ports to said inlet and exhaust means, a piston working in said combustion cylinder, a crank shaft operated by the movements of said piston, a lever fulcrumed on said crank shaft, said lever being connected to said controlling member and half time means for oscillating said lever to operate said controlling member.

3. In four stroke cycle internal combustion engines, in combination, a combustion cylinder provided with a port or ports adapted to be placed in communication with inlet and exhaust means, a reciprocating controlling member to open and close said ports to said inlet and exhaust means, a crank shaft having an eccentric mounted thereon, a lever fulcrumed on said eccentric intermediate its ends, a connection connected to said controlling member and to one end of said lever, means operatively positioned upon the other end of said lever for oscillating said lever, the movements of the means for oscillating said lever being so timed with respect to the said eccentric as to modify the movements of said lever operating said controlling member.

4. In four stroke cycle internal combustion engines, a combustion cylinder provided with inlet and exhaust means, a controlling member movable to open and close said inlet and exhaust means, a piston working in said combustion cylinder, a crank shaft having an eccentric mounted thereon, a lever intermediate its ends being fulcrumed on said eccentric, and at one end connected to said controlling member, half time means for oscillating the other end of said lever, the movement of said eccentric being so timed with relation to the movements of the means for oscillating said lever as to act together to cause the controlling member to effect communication between the combustion chamber and the inlet means at a time appropriate to the suction stroke, communication with said exhaust means during the exhaust stroke, and the closing of both of said means during the compression and explosion strokes of said working piston.

5. In four stroke cycle internal combustion engines, a combustion cylinder adapted to be placed in communication alternately with inlet and exhaust means, a controlling member movable to open and close said inlet and exhaust means, a piston working in said combustion cylinder, a crank shaft operated by the movements of said piston, an eccentric mounted on said crank shaft, a lever fulcrumed intermediate its ends on said crank shaft eccentric, connecting means connecting one end of said lever to said controlling member, a shaft adapted to revolve at one half the speed of said crank shaft, an eccentric or crank pin on said half speed shaft, means movably connecting said lever to the eccentric or crank pin on said half speed shaft whereby when said half speed shaft is rotated its eccentric or crank pin will oscillate said lever, modifying the movement imparted to said lever by said crank shaft eccentric, said eccentrics and lever being so disposed with relation to each other that during each cycle the controlling member opens and closes said combustion cylinder to said inlet and exhaust means, and holds said controlling member in its intermediate position closing said combustion cylinder during the compression and explosion strokes.

6. In four stroke cycle internal combustion engines, a combustion cylinder provided with inlet and exhaust means, a crank shaft or one speed shaft, a shaft rotated at one half speed of said crank shaft, an eccentric on said crank shaft, an eccentric or crank pin on said half speed shaft, a lever fulcrumed on the eccentric mounted on said crank shaft, a controlling member for opening and closing said inlet and exhaust means, a connection between said controlling member and the one end of said lever, the other end of said lever being oscillated by the half speed shaft by means of a crank pin or eccentric thereon.

7. In four stroke cycle internal combustion engines, a combustion cylinder provided with inlet and exhaust means, a piston working in said combustion cylinder, a reciprocating controlling member, a crank shaft operated by said piston, an eccentric on said crank shaft, a lever fulcrumed on said eccentric, a gear wheel mounted on said crank shaft, a half time gear or chain wheel provided with eccentrically mounted sliding means for rocking said lever driven by said first mentioned wheel, said eccentrically mounted sliding rocking means on said second wheel being so positioned with respect to the eccentric on said crank shaft that their throws are on corresponding sides of their respective centers at one point during each revolution of said second mentioned gear wheel, whereby said eccentrics will act together to cause said lever to move said controlling member for the opening and closing of said inlet and exhaust means, and act to arrest or retard the movement of said lever, thereby closing both said means for an appropriate time during the compression and explosion strokes of said piston.

8. In four stroke cycle internal combustion engines, a combustion cylinder provided with a port or ports adapted to be placed in communication with inlet and exhaust means, a piston working in said combustion cylinder, a crank shaft rotated by said piston, a toothed wheel mounted on said crank shaft, a second toothed wheel on a shaft rotated at one half the speed of said crank shaft, an eccentric mounted on said crank shaft, a bearing eccentrically mounted on said half speed shaft, a rocking lever fulcrumed intermediate its ends on the eccentric mounted on said crank shaft, said lever being also movably connected contiguous one end to the eccentrically disposed bearing on said half speed shaft, a valve for opening and closing said port to said inlet and exhaust means, a connection between said valve and the one end of said lever, thereby actuating the said valve to rapidly open and close said port to said exhaust means and then to said inlet means and during the compression and explosion strokes keeping said port closed for a sufficient time.

9. In a four stroke cycle internal combustion engine, a combustion cylinder provided with a port or ports adapted to be placed in communication with inlet and exhaust means, a valve adapted to open and close said port or ports to said inlet and exhaust means, a rocking lever connected to said valve, a movable fulcrum on the crank shaft on which said lever is fulcrumed intermediate its ends, a crank pin or eccentric on a half speed shaft, a movable guide carried by said half speed shaft, said lever having one end sliding in said guide and coacting in oscillating said lever to move said valve to alternately open and close said port to said inlet and exhaust means, and to hold said valve closed during two strokes of the cycle.

10. In four stroke cycle internal combustion engines, a combustion cylinder provided with a port or ports adapted to be alternately placed in communication with inlet and exhaust means, a controlling member movable to open and close said port or ports to said inlet and exhaust means, a piston working in said combustion cylinder, a crank shaft operated by said piston, a fulcrum eccentrically mounted on said crank shaft, a lever fulcrumed intermediate its ends on said crank shaft eccentric, connecting means connected to said controlling member, and to said lever contiguous one end, a shaft adapted to revolve at one half the speed of said crank shaft, an eccentric or crank pin on said half speed shaft, means movably connecting said lever contiguous its other end to said eccentric on the half speed shaft, said eccentrics being so disposed with relation to each other that during each revolution of said half speed shaft, said eccentrics effect the opening and closing of the controlling member to the exhaust and inlet and hold the controlling member in a nearly stationary position closing the said port during the compression and explosion strokes.

11. In four cycle internal combustion engines, a cylinder having a port adapted to communicate alternately with inlet and exhaust means, a slide valve adapted to open and close said port, a crank shaft, a lever fulcrumed on said crank shaft, a link connecting said lever with said valve at one end of said lever, and means mounted on a half speed shaft for oscillating the other end of said lever.

12. In four cycle internal combustion engines, a cylinder having an inlet and exhaust port, a slide valve having openings adapted to register with said exhaust and inlet ports, a main crank shaft and a half speed shaft, means for operating said half speed shaft, a lever fulcrumed on the said crank shaft, means for coupling one end of said lever to the half speed shaft whereby said lever is oscillated by the half speed shaft, and a link connecting said lever at the other end with the sliding valve, for imparting movement to the valve.

JAMES DENNIS ROOTS.

Witnesses:
H. D. JAMESON,
O. J. WORTH.